United States Patent [19]
Duff

[11] Patent Number: 5,596,837
[45] Date of Patent: Jan. 28, 1997

[54] INJECTION DEVICE FOR INJECTING ARTICLES INTO TREES AND A METHOD OF TREATING SAME

[75] Inventor: Michael Duff, Mississauga, Canada

[73] Assignee: Monsanto Canada Inc., Mississauga, Canada

[21] Appl. No.: 287,597

[22] Filed: Aug. 4, 1994

Related U.S. Application Data

[63] Continuation-in-part of Ser. No. 840,533, Feb. 25, 1992, abandoned.

[30] Foreign Application Priority Data

Mar. 28, 1991 [CA] Canada .................. 2039447

[51] Int. Cl.⁶ .................................. A01G 29/00
[52] U.S. Cl. ................ 47/57.5; 604/57; 604/62
[58] Field of Search .............. 47/57.5; 604/57, 604/59, 60, 62

[56] References Cited

U.S. PATENT DOCUMENTS

| | | |
|---|---|---|
| 2,290,363 | 7/1942 | Stirton . |
| 2,334,556 | 11/1943 | Howard et al. . |
| 2,687,598 | 8/1954 | Calhoun . |
| 2,795,899 | 6/1957 | Little . |
| 2,796,701 | 6/1957 | Mauget . |
| 2,867,943 | 1/1959 | Whitesell . |
| 2,870,576 | 1/1959 | Parker . |
| 2,934,859 | 5/1960 | Little . |
| 2,970,404 | 2/1961 | Beaufils et al . |
| 2,974,445 | 3/1961 | Vann . |
| 3,035,370 | 5/1962 | Carson . |
| 3,136,091 | 6/1964 | Phelps et al. . |
| 3,137,968 | 6/1964 | Laing . |
| 3,290,822 | 12/1966 | Mauget . |
| 3,295,254 | 1/1967 | Schoonman . |
| 3,367,065 | 2/1968 | Cravens . |
| 3,691,683 | 9/1972 | Sterzik . |
| 3,706,161 | 12/1972 | Jenson . |
| 3,864,874 | 2/1975 | Norris et al. . |
| 4,308,689 | 1/1982 | Jenson et al. . |
| 4,344,250 | 8/1982 | Fahlstrom . |
| 4,994,028 | 2/1991 | Leonard et al. ............ 604/60 |
| 5,284,479 | 2/1994 | de Jong .................... 604/60 |
| 5,288,291 | 2/1994 | Teoh ........................ 604/60 |
| 5,395,319 | 3/1995 | Hirsch et al. ............. 604/60 |

FOREIGN PATENT DOCUMENTS

| | | |
|---|---|---|
| 1191346 | 8/1985 | Canada . |
| 272644 | 12/1950 | France . |
| 2242064 | 3/1975 | France ................ 604/62 |
| 2287894 | 5/1976 | France ................ 604/62 |
| 382397 | 8/1973 | U.S.S.R. . |
| 786083 | 11/1957 | United Kingdom . |

*Primary Examiner*—Terry Lee Melius
*Assistant Examiner*—Joanne C. Downs
*Attorney, Agent, or Firm*—McFadden, Fincham

[57] ABSTRACT

There is disclosed an apparatus and method for treating trees. The apparatus includes an injecting device for injecting articles into trees. The device provides a plurality of article retaining tubes fixedly connected to a removable and rotatable delivery head and stationary therewith. A slidably mounted injection member is provided which slides coaxially along the tubes from a non-injecting position to an injecting position for injecting an article into a tree.

17 Claims, 5 Drawing Sheets

INJECTION DEVICE FOR INJECTING ARTICLES INTO TREES AND A METHOD OF TREATING SAME

This is a Continuation-In-Part application of U.S. Ser. No.: 07/840,533, filed Feb. 25, 1992.

FIELD OF THE INVENTION

The present invention relates to an apparatus and method of treating trees and plants having a cambium layer. More particularly, it relates to a device and method for injecting an article into a tree containing a treating injectant.

BACKGROUND OF THE INVENTION

The treatment of trees and other woody vegetation has, in the past, been done via airborne broadcast exposure of a treating compound to the vegetation to be treated. Recently, however, increasing environmental constraints have limited broadcast application and, as such, new methods and devices for treating trees have evolved out of necessity. Typically the use of capsules pre-charged with an chemical injectant for driving into a tree with a lance device have been developed in the art. Generally, the use of a lance device has been proposed to drive the capsules into trees since its use affords an economical, environmentally friendly and efficient manner to chemically treat the vascular system of a tree.

An example of a known lance used for this purpose is disclosed by Dillistone in Canadian Patent No. 1,191,346. The device employs an open slidably mounted loading mechanism for loading a capsule into contact with a driving member. The capsule must drop by gravity into a channel for engagement with the driving member. As such, the loading mechanism is highly susceptible to jamming and other mechanical limitations which require extensive disassembly in the field to repair. Further, due the exposure of the loading mechanism, branches and other debris enter the mechanism during use, eventually rendering it inoperative.

Various other lance devices are known in the art such as those disclosed in U.S. Pat. Nos. 2,795,899, 2,796,791, 2,290,363 and 3,290,822. Many of these devices employ a superfluous amount of parts, all of which are susceptible to mechanical failure and further are not well adapted for reliable use in the field.

From a consideration of the relevant art, one can clearly see that there is a need for a lightweight mechanically efficient lance which traverses the limitations of the prior art devices. To this end, Applicant with the present invention, addresses this need by providing a lance which is simple in construction, incorporating the least possible number of components, and further which is highly dependable during use.

SUMMARY OF THE INVENTION

Thus, one object of the present invention is to provide a device for injecting an article into a tree comprising:

at least one continuous retaining member for retaining a plurality of articles;

a non-movable head member having a passage extending therethrough, said head member being fixedly connected with said retaining member;

an injection member at least partially movable within the passage for injecting an article in the head into a tree; and a housing slidably mounted on the non-movable head member for housing and retaining the injection member whereby the housing is slidable to effect movement of the injection member from a non-injecting position within the head to an injecting position therein.

The lance of the present invention preferably includes a plurality of retaining members for retaining articles e.g. capsules which surround an injection member slidably received thereon and guided thereby. In this arrangement, the injection pin is axially slidable on the retaining members. Having regard to this, the retaining members are preferably elongated tubes and are fabricated from a suitable rigid material e.g. PVC, ABS, polycarbonates, aluminum, nylon, etc. and are sufficiently long to accommodate the injection pin for an injection stroke.

In applications for field use, the tubes may be of a length which is convenient for storing several capsules at once. The tubes may be encased in a rigid tubular body with an end cap in order to prevent damage to the tubes and further to provide rigidity to the lance.

The lance of the present invention includes a collar to which individual magazine tubes may be fixedly secured by, for example, threaded engagement or by using suitable adhesives. The collar rotatably and releasably receives the article delivery head, which may be rotated into engagement with further tubes upon exhaustion of a selected tube. Locking of the head into position may be achieved by the use of detent means e.g. a ball plunger.

A sleeve is provided to house and retain the injection member and is mounted for slidable movement on the head. The sleeve allows the injection member to abut internally thereof and couples the collar therewith. In this arrangement, the injection member, having resilient means e.g. a spring thereabout, is positioned between the collar and the injection member to provide the necessary bias for an injection stroke.

By incorporating a coaxial injection member in the device of the present invention, effort to operate the lance is substantially reduced, thus making it particularly useful in the field.

A further object of the present invention is to provide a method for treating trees with an injectable article comprising:

providing an injecting device including an article delivery head having at least one continuous retaining member connected therewith for retaining a plurality of articles, the device further including an injection member slidably mounted on at least one continuous retaining member and a slidable coupling member slidable on the head for coupling the injection member with the head;

loading an article into the head;

engaging the head with a tree; and sliding the coupling member forwardly of the head to effect movement of the injection member to an injecting position while maintaining at least one retaining member and the head stationary relative to the coupling member to thereby inject the article into the tree.

The axial injection operation of the present invention is further complemented by the article delivery head. The head is unitary and provides a passage extending therethrough common to articles received therein in a pre-injection position and a portion of the injection member.

Applicant has found that provided a tiered i.e. stepped axial bore within the head, merging with a linear axial bore, is highly effective for capsule delivery to the injection member with the added advantage of substantially reducing jamming inherent with prior art arrangements. Accordingly, a further object of the present invention is to provide a lance adapted for injecting articles into trees, the lance including a body for storing a plurality of articles therein, a sleeve slidably mounted thereon and an injection member connected therewith for movement between a non-injecting position and an injecting position for injecting an article into a tree, the improvement wherein:

the lance includes a rotatable head in operative association with the storage of the articles and adapted for engagement with a tree, the head including a single passage extending therethrough for receiving at least two of the articles therein in a pre-injection position and for receiving at least a portion of the injecting member whereby the passage is common to the injection member and received articles therein.

The present invention is particularly dependable since the capsules are retained, loaded and injected internally of the device to prevent exposure of the same to debris, etc. Further, since all of the components of the lance may be fabricated from suitable materials which are durable and lightweight e.g. PVC, ABS, aluminum, etc., the lance is well adapted for prolonged and maintenance-free use in the field.

In an alternate embodiment, the sleeve discussed herein may be replaced with outwardly extending handles to axially actuate the injection member.

In a further embodiment, the device may be reduced in dimension and include a suitable triggering mechanism operatively associated with the injection member.

Having thus generally described the invention, reference will now be made to the accompanying drawings, illustrating preferred embodiments.

DETAILED DESCRIPTION OF THE PREFERRED EMBODIMENTS

Figure 1:
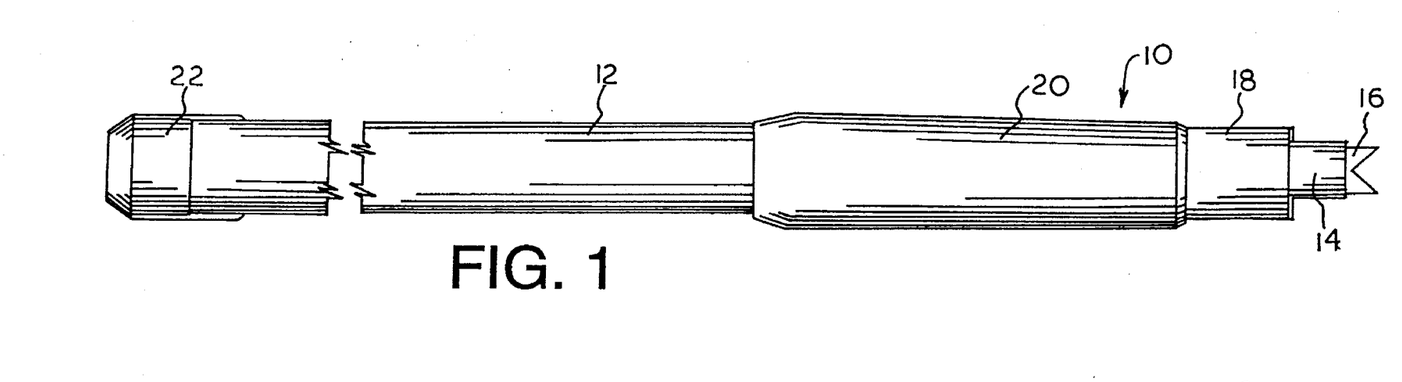
FIG. 1 is a perspective view of the present invention.

Turning now to the drawings, FIG. 1 illustrates a perspective view of the lance of the present invention, generally represented by numeral 10.

In general overview, the lance includes an elongated cylindrical body 12 having at a forward end thereof, a capsule injecting head 14 coaxial therewith. The head 14 includes a serrated tree engaging member 16 secured thereto and is rotatably received within a head collar 18. A coupling sleeve 20, coaxial with the body 12, couples the body 12 with collar 18. An end cap 22 may be included to retain the contents of the body 12.

Figure 2:
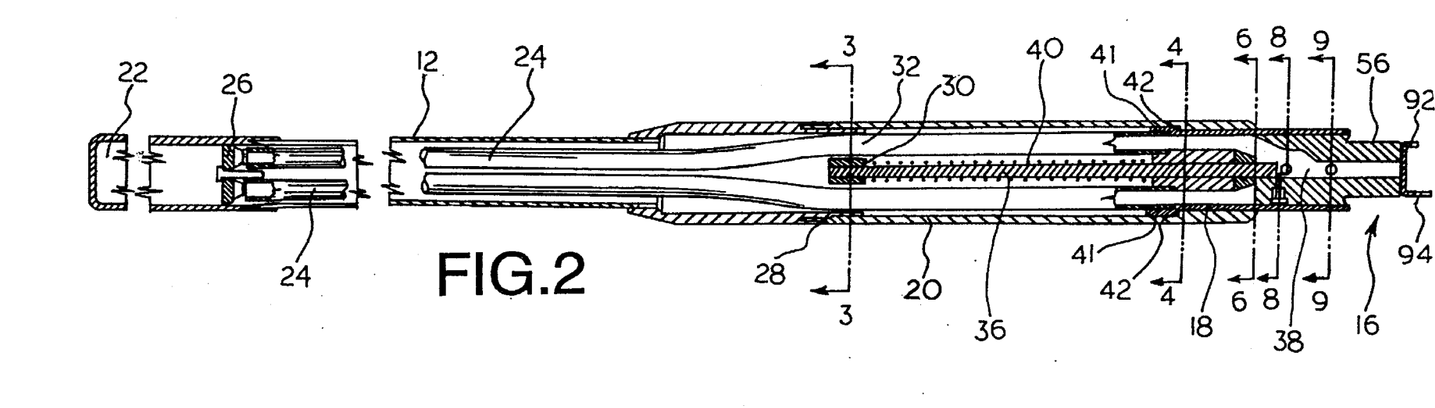
FIG. 2 is a longitudinal sectional view of the lance according to the present invention.

The lance 10 of the present invention is particularly well adapted to inject capsules e.g. 0.22 calibre rifle casings into trees; the capsules may be of the rimmed or non-rimmed variety. As such, the lance 10 includes a plurality of magazine tubes 24 within the elongated body 12 extending from adjacent the rearward end thereof to the forward end for fixed connection with the head collar 18 as illustrated in FIG. 2 (described in greater detail hereinafter). The tubes 24 are preferably constructed of a suitable lightweight sturdy material e.g. polycarbonate, nylon, PVC, ABS, aluminum etc. and include a common cover plate 26 releasably secured therewith for unloading the tubes 24 with capsules (not shown) and retention of the same therein. Since the magazine tubes 24 extend the length of the lance 10, several hundred capsules may be pre-loaded into the tubes 24 making field use of the lance 10 particularly convenient.

Figure 3:
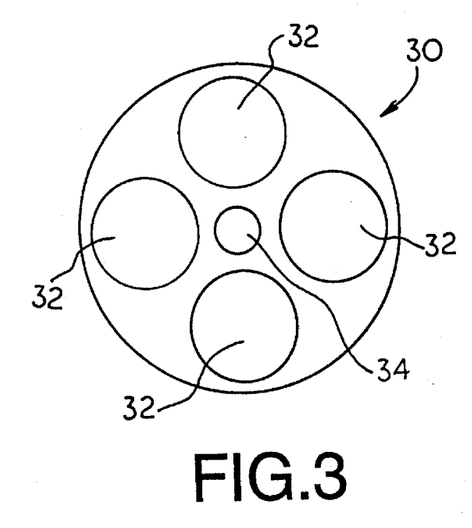
FIG. 3 is a section through line 3—3 of FIG. 2.

Referring now in greater detail to FIG. 2, the coupling sleeve 20 is preferably threaded to receive, coaxially, the forward end of the body 12. Within the sleeve 20 and forwardly of the connection thereof with body 12 is included an annular shoulder 28 against which abuts an injection pin holder 30 shown in cross-section in FIG. 3. As seen in FIG. 2, sleeve 20 changes from a thinner wall cross-section to a thicker wall cross-section at shoulder 28. The holder 30 comprises a metal disc having a plurality of peripherally arranged equidistant apertures 32 therethrough to receive magazine tubes 25.

Centrally located within the holder 30 there is included an injection pin mounting aperture 34 into which an injection pin 36 (FIG. 2) is mounted for injecting capsules into trees. The pin 36 is surrounded in a coaxial arrangement with the magazine tubes 24 and may be threaded to engage the pin holder 30 or may press fit therein so that the pin 36 is adapted for parallel axial movement with respect to the coupling sleeve 20 guided by the pin holder 30 along tubes 24. The injection pin 36 preferably extends axially through the head collar 18 and at least partially into head 16 via bore 38 extending axially therethrough. A spring 40 about the injection pin 36 extends between the holder 30 and the rearward internal surface of collar 18 about bore 38. In this arrangement, the pin 36 is maintained in parallel attitude with respect to the sleeve 20.

Figure 4:
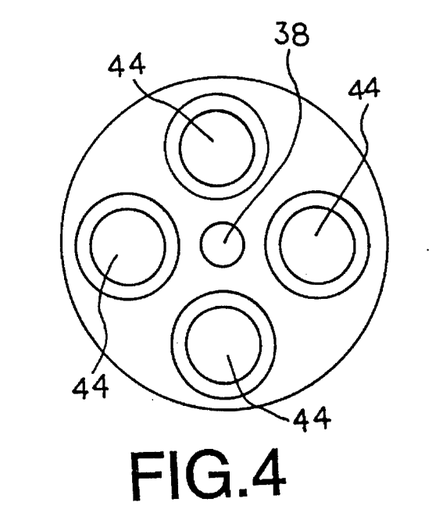
FIG. 4 is a section through line 4—4 of FIG. 2.

The head collar 18 provides an annular wall 41 at the rearward end thereof which abuts an annular shoulder 42 spaced inwardly from the forward end of coupling sleeve 20. FIG. 4 illustrates an end cross-section of the collar 18 in which there are located a plurality of annular sockets 44 into which the terminal ends of magazine tubes 24 are fixedly secured by e.g. a suitable adhesive briefly described herein previously. The annular sockets 44 each include an axially extending channel 46 (FIG. 5) within collar 18 which terminate at a smooth surfaced planar wall 48 of the collar 18. Each of the channels 46 terminate in a tapering downwardly inclined bore 50 which allows angular introduction into the head 14 hereinafter described. The tapered walls 50 converge towards the injection pin bore 38. The collar 18 preferably extends axially and forwardly of the sleeve 20 to provide a tubular housing 52 to rotatably and releasably receive the head 14 of the lance 10.

Figure 5:
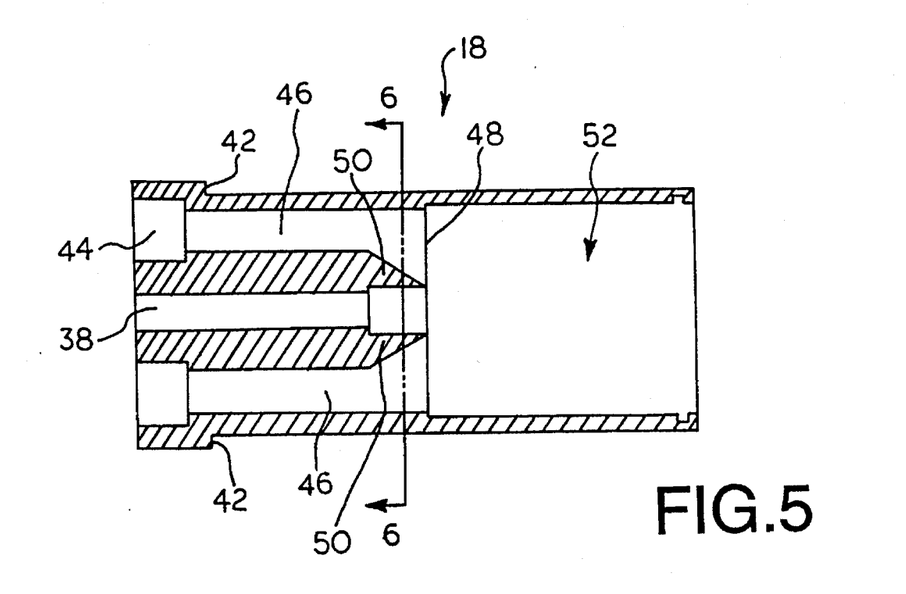
FIG. 5 is a side longitudinal sectional view of the head collar shown in FIG. 2.
Figure 6:
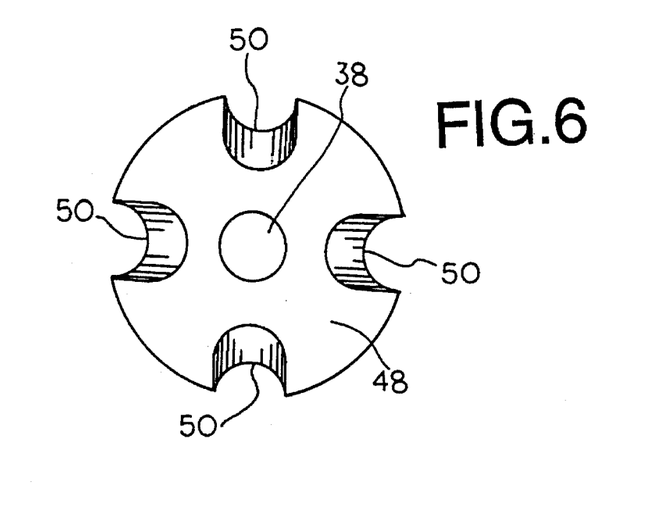
FIG. 6 is a section through line 6—6 of FIG. 5.

The head 14 preferably comprises a solid one-piece cylindrical body having a passage therethrough having a main body 54 and spaced inwardly therefrom a nose section 56 projecting from the main body 54. The rear face 58 of body 54 is preferably smooth and planar and contacts wall 48 of collar 18. The rear face 58 includes an ellipsoidally shaped opening 60 (FIG. 8) which allows communication of the injection pin 36 and a capsule channel 46 (FIG. 5).

Referring back to FIG. 7, a lower internal portion 62 of the head 14 is concave and parallel to the axis of the collar 18 and extends through the nose 56 to slidably accommodate injection pin 36 while an upper portion 64 includes a first inclined section 66 and a second spaced apart and parallel angularly inclined section 70 connected by a flat portion 68 which is parallel to the axis of the collar 18. The first inclined section 66 provides a first receiving area for a capsule and the flat portion 68 and second section provide a second receiving area for a capsule. The second section 70 communicates with a concave section 72 which is parallel to lower section 62 and further which extends through the nose section 56 to allow only enough room for the injection pin 36 and a single capsule (not shown), axially aligned therewith, to be received therein.

Figure 7:
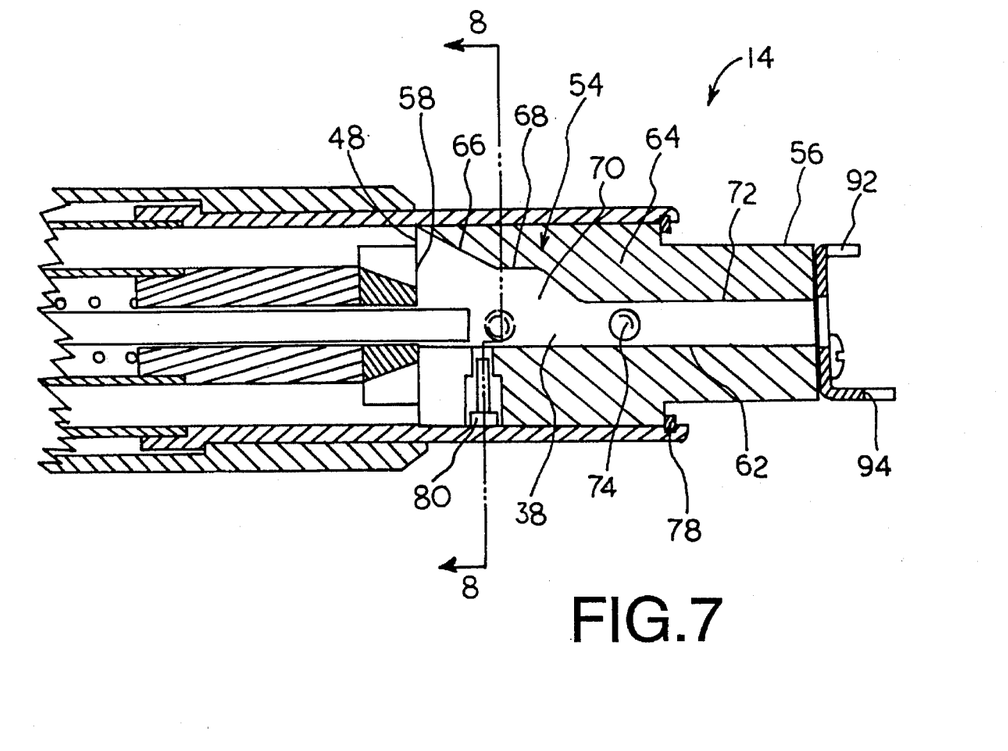
FIG. 7 is an enlarged view of FIG. 2.

The internal structure of the head 14 has been found to be of particular value for the prevention of capsule jamming therein.

The series of coaxial angularly inclined sections which merge with injection pin bore 38 are particularly useful for smooth uninterrupted delivery of a capsule through the head 14 and into a tree etc.

Figure 10:
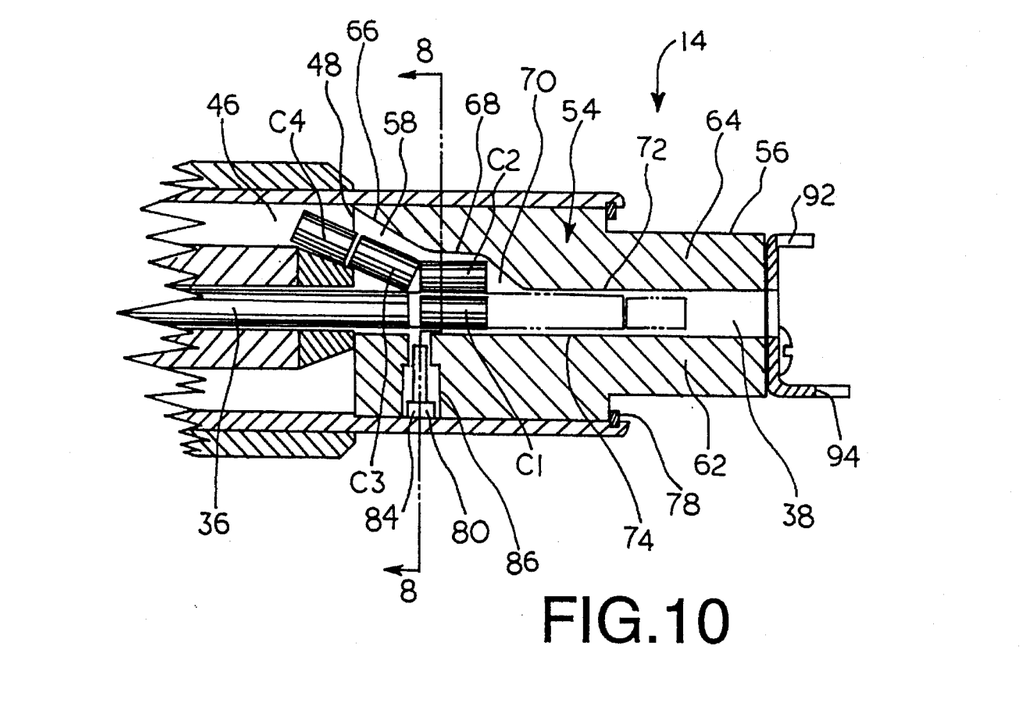
FIG. 10 is similar to FIG. 7 illustrating the capsule positioning.

The head 14 is capable of retaining a plurality of capsules simultaneously therein as illustrated in FIG. 10. The lance 10, during use, generally orients the head 14 in a downward direction. This results in the retained capsules within the tubes 24 entering head 14. When the injecting pin 36 is in a relaxed, non-injecting position, a capsule C1 drops into axial alignment therewith. The capsule C1 may move forwardly of the end of pin 36 however, the extent to which this occurs is limited by capsule stop means within the head 14 and in communication with bore 38 (discussed hereinafter in greater detail). Once capsule C1 is positioned, further capsules are received in the head 14 such as illustrated in the Figure. A capsule C2 is received within the area defined by portions 68 and 70 in a substantially parallel position with capsule C1 prior to the same being injected. A further capsule C3 is received within the area defined by portion 66 and the tip of pin 36. This capsule is trailed by a capsule C4 which is at least partially within channel 46 of collar 18. During an injection stroke, capsule C1 is urged through bore 38. In a post-injection phase, capsule C3 moves into the position previously occupied by C1 and consequently C3 moves into the position of C2 and so on. Due to the internal dimension of the bore 38 and receiving areas of the head 14, the arrangement is particularly resistant to jamming.

Figure 9:
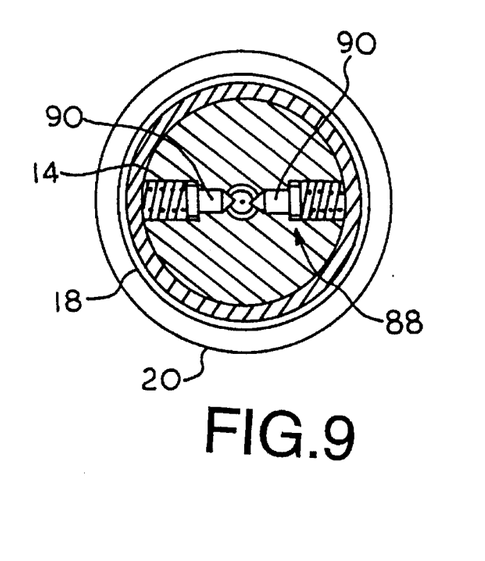
FIG. 9 is a section through line 9—9 of FIG. 2.

Once a magazine tube 24 has been exhausted, the head 14 may simply be rotated about a horizontal axis for registration of opening 60 of the head 14 with (a selected) bore 50 of collar 18. Locking engagement between the collar 18 and head 14 is achieved by detent means 74 e.g. a ball plunger which is received within a suitably oriented and radially aligned aperture in collar 18 as illustrated in FIG. 9. A releasable circlip 78 connected to the forward end of collar 18 abuts the annular area of the head 14 between the main body. 54 and nose 56 to retain the same therein.

Due to the internal geometry of the head 14, smooth, non-jamming capsule delivery is dependent upon the attitude of the head 14 with respect to a tree to be injected. This will be readily understood from an examination of FIG. 8. This shows the proper geometric attitude for the lance 10 to be operated i.e. with the upper portion 64 facing upwardly. Provided the upper portion 64 remains to the top, the lance 10 may be operated to inject a capsule into a tree. If an attempt to operate the lance 10 is made while the head 14 is inverted, injection will not occur. Injection is prevented with stop means 80 which is freely slidably mounted within head 14. The stop means 80 comprises a stop pin 82, which is slidable within a bore 86 transverse to the injection pin bore and in communication therewith. An enlarged head 84 on pin 82 limits the travel of the same. The stop pin bore 86 is preferably positioned within the head 14 directly below the front tip of injection pin 36. When the lance 10 is in an improper attitude, stop pin 82 slides through bore 86 and into contact with the tip of the injection pin 36 thus preventing the axial injection motion of the same. This is particularly useful since the capsules are improperly oriented within head 14 when the same is in the improper attitude and, as a result, an attempt to inject would result in jamming or damage to the injection pin 36.

Figure 8:
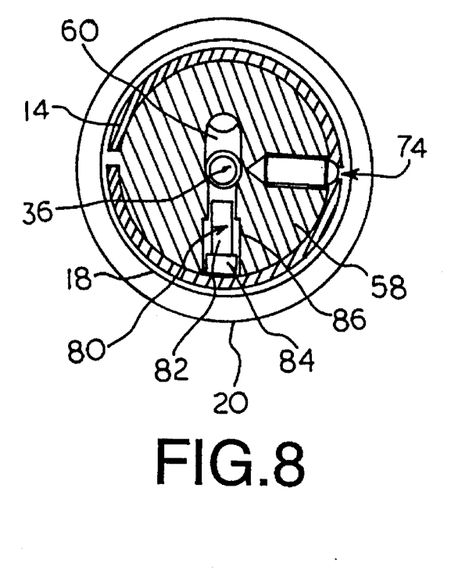
FIG. 8 is a section through line 8—8 of FIG. 2.

Such a feature is advantageous during field use since a user is instantly aware of improper orientation. To continue use of the lance 10, a user simply rotates the lance until stop pin 82 retracts; the capsules will then self-reposition to the proper position as described herein previously.

Inadvertent loss of capsules within head 14 from the lance, as well as pre-injection positioning therein (briefly described herein previously) when in a vertical position, is prevented by capsule stop means 88 illustrated in FIG. 9. The stop means 88, positioned forwardly of stop pin 82 comprises, in one form, a pair of opposed pins 90 mounted within head 14 and biassed to project inwardly of the injection pin bore to prevent a capsule from inadvertent sliding therethrough.

A tree engaging member 16, briefly mentioned herein previously, is provided on the front of the nose 56 axially projecting therefrom and fastened thereto. The engaging member 16 preferably comprises upper 92, and spaced therefrom, lower 94 serrated tree engaging surfaces. The serrated surfaces allow the lance 10 to be used on immature as well as mature trees without difficulty, since lateral shifting of the lance 10 is prevented by the serrated surfaces. In addition, the upper portion 92 of member 16 is shorter in length than portion 94, which assures proper angular orientation of the lance 10 in use. The engaging member 16, of course, may be varied in structure as this is not critical to the operation of the lance 10.

In operation, the magazine tubes 24 of the device 10 are loaded and cover plate 26 positioned thereover. The lance 10 is now ready for use and may be engaged with a tree (not shown) for treatment with engaging member 16. Once engaged, the lance may be urged forwardly towards the tree which triggers a sequence of events internally of the lance 10. The result of this axial force can be understood with reference to FIG. 2. The lance 10 may be held along the body 12 or sleeve 20 to effect injection. During an injection stroke, the body 12 and sleeve 20 are moved relative to the head 14. The forward end of sleeve 20 slides axially along the tubular housing 52 of collar 18 while head 14 received therein is stationary.

As is evident from FIGS. 1, 2 and 10, injection is accomplished by the user manually gripping either or preferably both of body 12 and sleeve 20 and pushing, at a downward angle, toward the tree or other surface to be penetrated. The axial force imparted to the lance 10 by the user is translated to the spring 40, extending about pin 36 and between injection pin holder 30, to the rearward internal surface of collar 18. As seen in FIG. 2, sleeve 20 changes from a thinner wall cross-section to a thicker wall cross-section at shoulder 28. As the sleeve 20 moves forwardly, the annular shoulder 28 butts tightly against the periphery of injection pin holder 30, and as sleeve 20 is pushed toward the tree the injection pin holder 30 and injection pin 36 are moved toward the tree also. Again, as will be seen from the drawings, forward movement of pin holder 30 also compresses spring 40, which surrounds injection pin 36, against the rearward internal surface of head collar 18 which surrounds bore 38. On injection, sleeve 20, body 12, injection pin holder 30 and injection pin 36 move together toward the tree: injection pin 36 advances in bore 38 until it passes through head 14 sufficiently to inject capsule C1 etc. into the tree. The capsule only needs to reach the outer extent of the tree's vascular system: deep penetration is not necessary. The capsule motion within the head 14 occurs as previously described herein.

As will be seen from drawings, FIGS. 1, 2, 7 and 10, on ceasing the injection action, spring 40 decompresses and returns injection pin holder 30, pin 36, sleeve 20 and body 12 to their original positions relative to head 14 and head collar 18. If the head 14 is removed from the tree as soon as injection has occurred, head 14 and head collar 18 are thrown forward by spring 40 and another capsule falls into place in front of injection pin 36. As seen in FIGS. 1, 2 and 7 it is evident that sleeve 20 slides along the surface of housing 52 of stationary head collar 18 and body 12 slides along stationary magazine tubes 24. Injection pin 36 retracts to just beyond stop means 80 (FIGS. 7 and 10) and injection pin holder retracts to again abut against shoulder 28. Sleeve 20 has a forward shoulder which, on retraction, fits against shoulder 42 in head collar 18.

In the above mode, the spring 40 is loaded and released by the user's manual application and termination of forward force.

Figure 11:
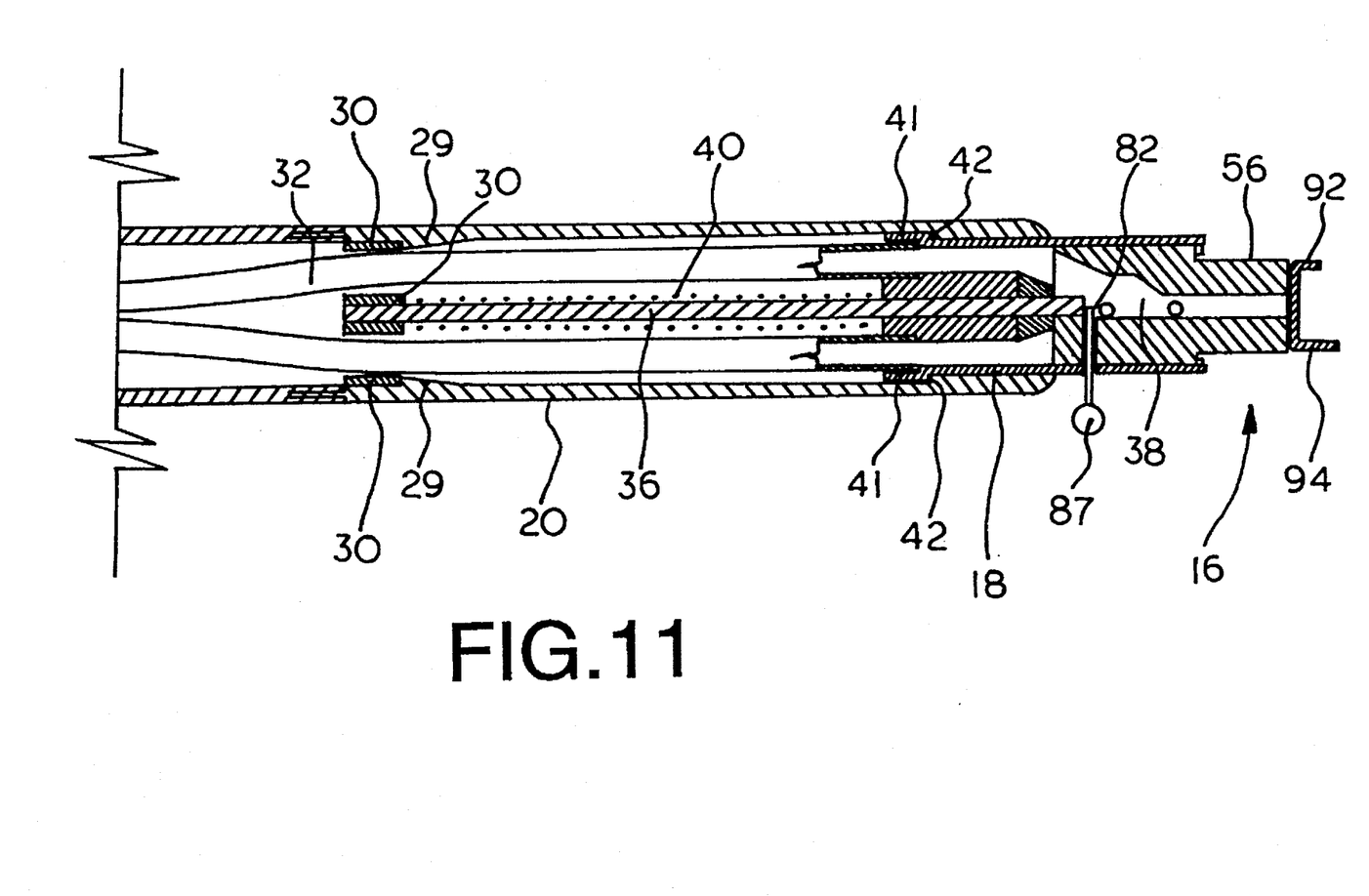
FIG. 11 is a sectional view as in FIG. 2 showing part of the lance adapted for optimal spring force injection.

The drawings show that spring force can be used for injection if desired. For example, it is possible for the spring 40 to be selected to be at rest when in the full injection position and to be loaded when in the retracted or extended position (see FIG. 11). In this case the rearward end of spring 40 would be fastened (e.g. welded) to injection pin holder 30 and the forward end fastened to the rearward internal surface of head collar 18; and sleeve 20 would either be fastened to injection pin holder 30 or have a rearward facing shoulder (see 29 in FIG. 11) adapted to engage the forward edge of injection pin holder 30. Stop means 80 including pin 82 could be adapted and used as a trigger (see 87 in FIG. 11). The user would forcibly retract (relative to head 14) sleeve 20, injection pin holder 30, injection pin 36 and extend spring 40 from the injection position until the forward end of injection pin 36 retracts past pin 82 of stop means 80. Pin 82 could be biased into a stop position and have trigger means (e.g. 87 in FIG. 11) to withdraw it and release the injection pin 36. Extended spring 40 would contract to its compact "at rest" position (on release of the trigger) and cause the injection travel of injection pin 36 and the injection of a capsule. Time should be allowed between extension loading of spring 40 and release of the trigger 82 for a capsule to load into bore 38. This optional mode is illustrated in FIG. 11 in which spring 40 is shown in extended/loaded position, and stop means 80 is shown adapted as a trigger 87. On withdrawal of the trigger 87 with pin 82 from bore 38, spring 40 will contract and cause injection.

It will be appreciated that the present lance may be easily maintained due to the low number of moving parts. Stop and detent means operate under gravity or spring loading, as explained above.

As is evident from FIGS. 2, 7 and 10, the main parts that remain stationary during injection are tree engaging member 16, head 14, head collar 18, and magazine tubes 24. The main moving parts are body 12, sleeve 20, injection pin 36 and its pin holder 30, and spring 40. The capsules feed by gravity into bore 38. Head 14 is able to be rotated in head collar 18 so that opening 60 in head 14 connects with a selected magazine tube 24.

In addition, disassembly is simple since the lance 10 comprises only a few chief components, namely: a sleeve 20, magazine tubes 24, head 14 and injection pin 36.

Although specific embodiments of the present invention have been described above, it is not limited thereto and it will be apparent to those skilled in the art that numerous modifications form part of the present invention insofar as they do not depart from the spirit, nature and scope for the claimed and described invention.

I claim:

1. An apparatus for injecting an article into a tree comprising:

at least one continuous retaining member for retaining a plurality of articles;

a non-movable head having a passage extending therethrough, said head being fixedly connected with said at least one continuous retaining member;

an injection member at least partially movable within said passage for injecting an article in said head into a tree; and a housing slidably mounted on said non-movable head for housing and retaining said injection member whereby said housing is slidable to effect movement of said injection member from a non-injecting position within said head to an injecting position therein.

2. The apparatus as defined in claim 1, wherein said apparatus includes a plurality of continuous retaining members.

3. The apparatus as defined in claim 2, wherein said plurality of continuous retaining members surround said injection member in a coaxial relationship therewith.

4. The apparatus as defined in claim 2, wherein said injection member includes an apertured disc for slidably receiving said plurality of continuous retaining members and guiding said injection member therealong.

5. The apparatus as defined in claim 4, wherein said injection member includes resilient means mounted thereon and between said disc and said passage of said head.

6. The apparatus as defined in claim 1, wherein said apparatus includes a collar, said collar being releasably mounted within said housing.

7. The apparatus as defined in claim 6, wherein said collar releasably receives said head.

8. The apparatus as defined in claim 7, wherein said head is rotatable within said collar.

9. The apparatus as defined in claim 6, wherein said collar includes at least one channel therein having a downwardly inclined portion.

10. The apparatus as defined in claim 9, wherein said retaining member each comprises an elongated continuous tube having opposed ends, one of said ends adapted to receive a plurality of said articles, the other of said end ends being in communication and secured to said channel in said collar.

11. The apparatus as defined in claim 1, wherein said passage of said head includes a centrally located axial bore extending therethrough for reception of said injection member and one of said articles, said passage further including integral therewith a first downwardly inclined portion and a second downwardly inclined portion parallel therewith, said first portion and said second portion connected by a substantially axially oriented portion.

12. The apparatus as defined in claim 11, wherein said head includes stop means in communication with said axial bore for stopping said injection member from passing therethrough.

13. The apparatus as defined in claim 12, wherein said head includes a tree engaging member adapted to orient said head in an attitude with respect to a tree wherein said stop means is free of said axial bore.

14. The apparatus as defined in claim 12, wherein said axial bore includes article stop means for preventing an article from inadvertently sliding through said axial bore.

15. The apparatus as defined in claim 5, wherein said resilient means is a spring adapted to be compressed on injecting movement and to restore said injection member to the non-injecting position after injection.

16. The apparatus as defined in claim 5, wherein said resilient means is a spring adapted to be extended when in the non-injecting position, and on release, to contract and cause injection movement.

17. A device for injecting an article into a tree, comprising:

an elongated body;

an article delivery head coaxial with said body, said head including a passage extending therethrough;

at least one article retaining member fixedly connected to said head and in operative association with said passage;

said at least one article retaining member comprising an elongate continuous tube having opposed ends, one of said ends adapted to receive a plurality of articles, the other of said ends being in communication with and secured to said passage;

an injection member coaxial with said passage and mounted for slidable movement from a first non-injecting position to an injecting position within said passage for injecting an article into a tree; and a cylindrical housing coaxial with and slidably mounted on said head for housing and retaining said injection member whereby said housing is slidable to effect movement of said injection member.

* * * * *